US012783640B2

(12) United States Patent
Kussmaul et al.

(10) Patent No.: US 12,783,640 B2
(45) Date of Patent: Nov. 3, 2026

(54) VERIFYING COMPLIANCE OF A WORKLOAD EXECUTING IN A TRUSTED EXECUTION ENVIRONMENT

(71) Applicant: INTERNATIONAL BUSINESS MACHINES CORPORATION, Armonk, NY (US)

(72) Inventors: Timo Kussmaul, Boeblingen (DE); Dimitrij Pankratz, Boeblingen (DE); Ephraim Petry, Stuttgart (DE); Falk Posch, Holzgerlingen (DE); Marco Pavone, Ehningen (DE); Muhammad Usman Karim Khan, Sindelfingen (DE); Oliver Rau, Pirmasens (DE); Stefan Liesche, Böblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 183 days.

(21) Appl. No.: 18/781,626

(22) Filed: Jul. 23, 2024

(65) Prior Publication Data

US 2026/0030341 A1 Jan. 29, 2026

(51) Int. Cl.
*G06F 21/53* (2013.01)
*G06F 21/55* (2013.01)

(52) U.S. Cl.
CPC .............. *G06F 21/53* (2013.01); *G06F 21/55* (2013.01)

(58) Field of Classification Search
CPC ........... G06F 21/53; G06F 21/55; G06F 21/57
See application file for complete search history.

(56) References Cited

U.S. PATENT DOCUMENTS

2022/0094690 A1* 3/2022 Tarkhanyan ............ G06F 9/505
2022/0103379 A1 3/2022 Bursell
(Continued)

FOREIGN PATENT DOCUMENTS

WO WO-2022050930 A1 * 3/2022 ............. G06F 9/468

OTHER PUBLICATIONS

"About the contract," IBM Corporation, Jun. 28, 2024, 33 pp., [online][retrieved Jul. 8, 2024] https://cloud.ibm.com/docs/vpc?topic=vpc-about-contract_se.
(Continued)

*Primary Examiner* — Trong H Nguyen
(74) *Attorney, Agent, or Firm* — Seed IP Law Group, LLP

(57) ABSTRACT

Provided are a computer program product, system, and method for verifying compliance of a workload executing in a trusted execution environment. A control program for a trusted execution environment has a plurality of control elements provided by users. A control element of the control elements includes a command to execute to verify compliance of an element in a workload in the trusted execution environment with a requirement. A trigger event, associated with a triggered control element of the control elements, is detected during execution of the workload in the trusted execution environment. The command for the triggered control element is executed to verify compliance of an element in the workload. The triggered control element is executed multiple times during execution of the workload to verify compliance of the element in the workload in response to multiple instances of detecting the trigger event.

20 Claims, 6 Drawing Sheets

(56) References Cited

U.S. PATENT DOCUMENTS

| | | | | |
|---|---|---|---|---|
| 2023/0068221 | A1* | 3/2023 | Magowan | H04L 9/3247 |
| 2023/0106455 | A1 | 4/2023 | Bursell | |
| 2023/0128099 | A1* | 4/2023 | Nunez Mencias | G06F 21/53<br>726/26 |
| 2023/0274001 | A1 | 8/2023 | Boyle | |
| 2024/0241944 | A1* | 7/2024 | Smith | H04L 63/20 |

OTHER PUBLICATIONS

"Restricting Who Can Provide Secrets and Data to a Kubernetes Confidential Computing Deployment," IP.com, IP.com No. IPCOM000271402D, Dec. 6, 2022, 5 pp.
"Virtual Private Cloud (VPC)," IBM Corporation, Jul. 12, 2024, 65 pp.

* cited by examiner

VERIFYING COMPLIANCE OF A WORKLOAD EXECUTING IN A TRUSTED EXECUTION ENVIRONMENT

BACKGROUND OF THE INVENTION

1. Field of the Invention

The present invention relates to a computer program product, system, and method for verifying compliance of a workload executing in a trusted execution environment.

2. Description of the Related Art

Sensitive workload and data may be protected during execution by use of Confidential Computing, such as a trusted execution environment. A trusted execution environment is a secure area of a main processor in which the code and data loaded within the trusted execution environment is protected with respect to confidentiality and integrity. Data confidentiality prevents unauthorized entities from outside the trusted execution environment from reading data, while code integrity prevents code in the trusted execution environment from being replaced or modified by unauthorized entities.

In a trusted execution environment, a machine readable "contract" describes, in a secure manner, the secrets and properties of applications and their environment which are to be executed in the trusted execution environment. The contract is static and attestable in the trusted execution environment. The contract is further immutable, encrypted, and signed. The contract may include secret components created by multiple personas in a coordinated and secure way. The trusted execution environment ensures the integrity of the workload and its environment against the properties contained in the contract after deployment or boot.

SUMMARY

Provided are a computer program product, system, and method for verifying compliance of a workload executing in a trusted execution environment. A control program for a trusted execution environment has a plurality of control elements provided by users. A control element of the control elements includes a command to execute to verify compliance of an element in a workload in the trusted execution environment with a requirement. A trigger event, associated with a triggered control element of the control elements, is detected during execution of the workload in the trusted execution environment. The command for the triggered control element is executed to verify compliance of an element in the workload. The triggered control element is executed multiple times during execution of the workload to verify compliance of the element in the workload in response to multiple instances of detecting the trigger event.

DETAILED DESCRIPTION

Figure 1:
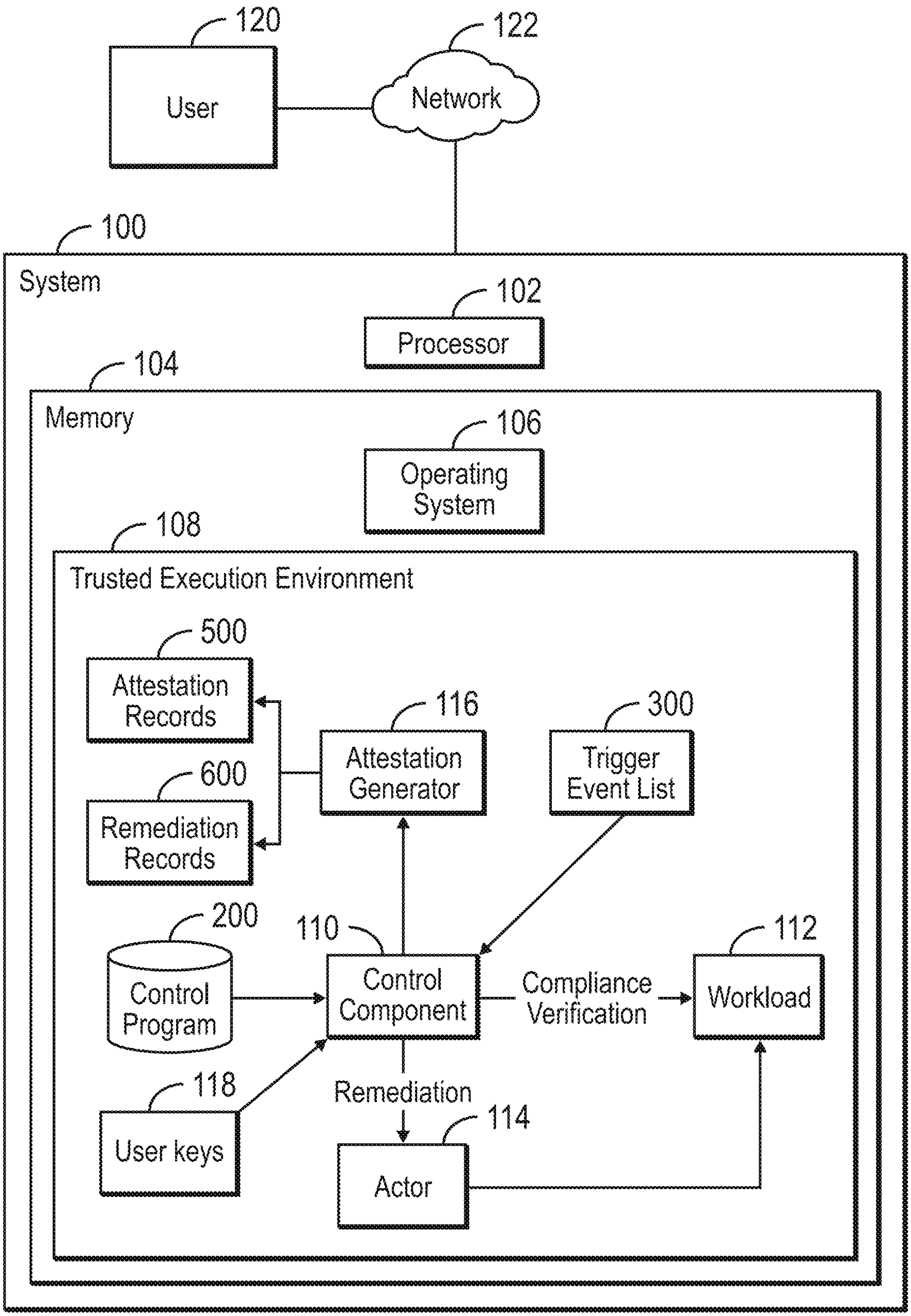
FIG. 1 illustrates an embodiment of a trusted execution environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description herein provides examples of embodiments of the invention, and variations and substitutions may be made in other embodiments. Several examples will now be provided to further clarify various embodiments of the present disclosure:

Example 1: A computer-implemented method comprising providing a control program for a trusted execution environment having a plurality of control elements provided by users. A control element of the control elements includes a command to execute to verify compliance of an element in a workload in the trusted execution environment with a requirement. The method further comprises detecting a trigger event associated with a triggered control element of the control elements during execution of the workload in the trusted execution environment. The method further comprises executing the command for the triggered control element to verify compliance of an element in the workload. The triggered control element is executed multiple times during execution of the workload to verify compliance of the element in the workload in response to multiple instances of detecting the trigger event. Thus, embodiments advantageously provide for continued execution of control elements triggered by a trigger event to allow continued compliance verification of a workload in a trusted execution environment to determine if the workload becomes non-compliant during operations.

Example 2: The limitations of any of Examples 1 and 3-9, where a control element of the control elements includes a remediation action to execute if the executed command of the control element does not verify compliance of the element in the workload. The method further comprises executing the remediation action of the control element in response to the executed command of the control element not verifying compliance of the element in the workload. Thus, embodiments advantageously provide for a remediation action to perform in response to not verifying compliance to allow for corrections, fixes or changed authorizations in the workload environment to increase security and to maintain performance.

Example 3: The limitations of any of Examples 1, 2 and 4-9, where the remediation action is a member of a set of remediation actions consisting of shutting down the workload executing in the trusted execution environment, implementing a read-only mode for operations in the workload, restricting access to resources in the workload, executing a fix program to modify parameters in the workload, key rotation, and disable features. Thus, embodiments advantageously provide for a remediation action that can protect from security breaches by shutting down the workload, implementing a read-only mode, restricting access to resources, key rotation, and disable features. Further, the remediation action may advantageously improve execution by executing a fix program to modify parameters in the workload.

Example 4: The limitations of any of Examples 1-3 and 5-9, where the method further comprises including a result of the executing the remediation action in a record identifying the control element having the executed command. The method further comprises returning the record to a user that provided the control element having the executed remediation action. Thus, embodiments advantageously return a record to a user providing information on the executed remediation action to inform the user that provided the control element on a result of execution of a remediation action when the compliance of the workload was not verified.

Example 5: The limitations of any of Examples 1-4 and 6-9, where the verifying compliance of an element of the workload is a member of a set of compliance verifications consisting of: comparing a software bill of materials of the workload with a list of vulnerabilities; checking vulnerability of databases accessed by the workload; monitoring workload behavior for behavior indicating vulnerabilities; checking for network activity indicating vulnerabilities; and checking on operability of dependent systems. Thus, embodiments advantageously provide for verifying compliance to check for vulnerabilities in the workload, including vulnerabilities related to the software bill of materials of the workload, network activity and to check for operability of dependent systems.

Example 6: The limitations of any of Examples 1-5 and 7-9, where the trigger event is a member of a set of trigger events consisting of expiration of a time period, an occurrence of a specified result in the workload, and an unauthorized user attempting to access a resource. Thus, embodiments advantageously allow for continuous checking of compliance verification even as the workload changes over time by performing compliance checking periodically and when events occur that are indicative of a security breach.

Example 7: The limitations of any of Examples 1-6, 8, and 9, where the method further comprises receiving encrypted control elements from users. The method further comprises including the encrypted control elements in the control program. The method further comprises decrypting a control element in the control program to execute using a decryption key. Thus, embodiments advantageously have the control elements encrypted in the control program to prevent any other users, including other authorized users of the trusted execution environment, from accessing control elements provided by other users.

Example 8: The limitations of any of Examples 1-7 and 9, where the method further comprises generating an attestation record in response to executing the command for the control element including a result of verifying compliance of the element in the workload and an identifier of the control element having the executed command. The method further comprises providing the attestation record to the user that provided the control element. Thus, embodiments advantageously provide the user that supplied a control element an attestation record having information on whether the workload complied with a requirement of the control element the user provided.

Example 9: The limitations of any of Examples 1-8, where the method further comprises generating a hash code from content of the control element. The method further comprises providing the hash code to a user that provided the control element to include in the control program. The user generates a hash code from a user version of the control element to compare with the provided hash code to verify that the control program is executing the control element from the user. Thus, embodiments advantageously allow a user that supplied the control element to process a record from the trusted execution environment to determine whether the control element the user provided is being processed in the control program by performing a hash code verification of a hash code generated from the control element to determine if the received record concerns the control element the user provided.

Example 10 is an apparatus comprising means to perform a method of any of the Examples 1-9.

Example 11 is a machine-readable storage including machine-readable instructions, when executed, to implement a method or realize an apparatus of any of the Examples 1-9.

Example 12: A system comprising one or more processor and one or more computer-readable storage media collectively storing program instructions which, when executed by the processor, are configured to cause the processor to perform a method according to any of Examples 1-9.

Example 13: A computer program product comprising one or more computer readable storage media, and program instructions collectively stored on the one or more computer readable storage media, the program instructions comprising instructions configured to cause one or more processors to perform a method according to any one of Examples 1-9.

Described embodiments provide improvements to trusted execution environment technology by enabling attestable control of continuous integrity of workloads and their environments in a trusted execution environment. Described embodiments extend the contract model to a control program that allows for control elements provided by different users to define the required integrity aspects and the timing of when compliance verification of the control elements are performed. This allows multiple parties to securely cooperate in defining their respective control elements without exposing their control elements other parties.

Described embodiments further provide a control component that controls the integrity of workload and its environment according to continued execution of the control elements defined in the control program during runtime of the workload. The control component may create "attestation" measurements in the form of records for the control elements to enable the users that supplied the control elements to validate their integrity requirements independently, while ensuring separation of information (regarding the control elements) between different users, or personas.

Described embodiments further provide control elements that contain remediation actions. If the compliance test of a control element cannot be validated, then the control element executes the remediation action to attempt to eliminate the source of the failed compliance check. For instance, if a control element compliance verification detects a vulnerable library in the workload, a remediation action can update the library from a trusted source, thus re-establishing integrity of the workload. The control component may further create a remediation record providing a measurement and information on the executed remediation action and the result of the execution. These improvements to the trusted execution environment allow the relevant parties to independently validate integrity of the workload in the trusted execution environment with respect to the control elements supplied by the parties.

FIG. 1 illustrates an embodiment of a system, which may comprise a bare metal, virtual or cloud system 100 hosting processing resources, including a processor 102, memory 104, and operating system 106. The system 100 may implement a trusted execution environment 108, comprising a segregated area of memory and processor 102 resources that are protected from the rest of the processor 102 using encryption. Data in the trusted execution environment 108 cannot be read or tampered with by any code outside that environment. Data can be manipulated inside the trusted execution environment 108 by authorized code.

Figure 2:
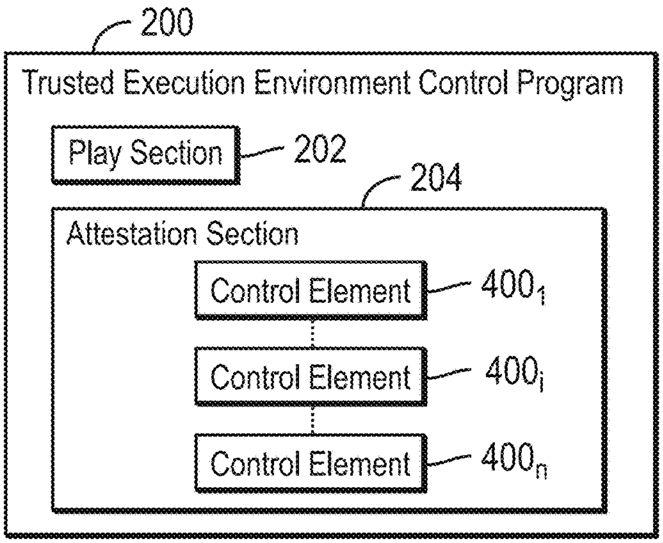
FIG. 2 illustrates an embodiment of a control program defining components of the workload in the trusted execution environment and control elements to verify compliance of the workload with requirements of the trusted execution environment.

The trusted execution environment includes a control component 110 that processes a control program 200, as shown in FIG. 2, also known as a computer readable contract in trusted execution environment systems, that includes control elements $\mathbf{400}_1 \ldots \mathbf{400}_n$ in an attestation section 204. The control elements $\mathbf{400}_i$ define commands or programs to run to perform compliance verification testing of elements produced by a workload 112 executing in the trusted execution environment 108. The tested workload elements may comprise functions, variables, properties, databases, network ports, user accesses, etc. The workload 112 comprises containers and programs executing in the trusted execution environment 108 and is defined in the play section 202 of the control program 200. The control program 200 may include additional sections found in machine readable contracts defining a trusted execution environment 108.

The control elements $\mathbf{400}_i$ may be provided by users at user systems 120 communicating the control elements $\mathbf{400}_i$ over a network 122 to the control component 110. The control component 110 may add the user supplied control elements $\mathbf{400}_i$ to the control program 200.

Figure 3:
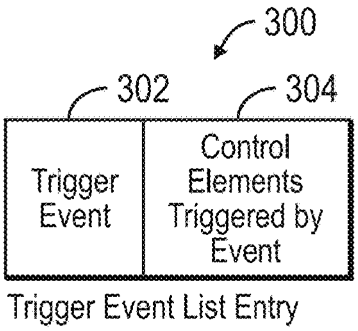
FIG. 3 illustrates an embodiment of a trigger event list entry to associate control elements with triggered events whose occurrence causes execution of the associated control elements.

The control component 110 maintains a trigger event list 300 indicating events, such as expiration of time periods or events occurring in the workload 112, that trigger specified control elements $\mathbf{400}_i$. A shown in FIG. 3, an event list entry $\mathbf{300}_i$ indicates an event 302 and one or more control elements 304, i.e., triggered control elements 308, that are triggered by the occurrence of that event 302.

Figure 4:
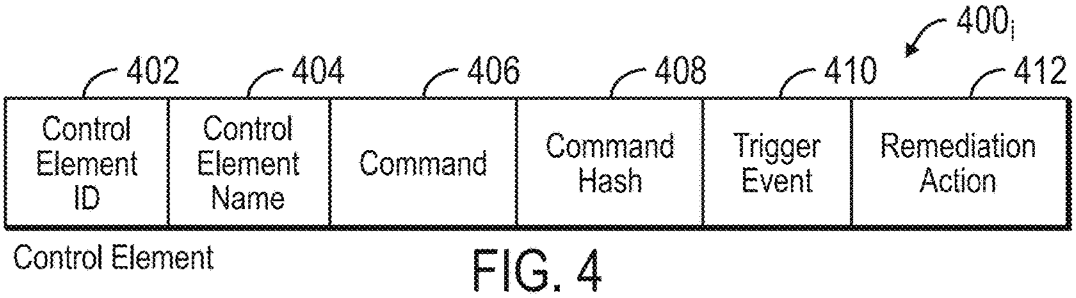
FIG. 4 illustrates an embodiment of a control element to perform a compliance verification of a workload in the trusted execution environment.

The control component 110 executes a control element $\mathbf{400}_i$ in response to the occurrence of the trigger event 302 associated with the control element $\mathbf{400}_i$ to perform a compliance verification operation with respect to an element in the workload 112. A control element $\mathbf{400}_i$, as shown in FIG. 4, may include a control element ID 402; a control element name; a command 406 or program that is executed to perform the compliance verification for the control element 400*i*; a command hash 408 used to verify the command 406 is correct before executing; an optional trigger event 410 if the control element $\mathbf{400}_i$ is to be processed after initialization and during running of the workload 112; and a remediation action 412 to perform if the compliance verification operation of the command 406 does not verify compliance of a workload element with the compliance requirements.

If the control component 110 does not verify compliance of a specified workload element after executing the command 406, then the control component 110 calls an actor 114 to execute the remediation action 412 specified in the control element $\mathbf{400}_j$. The remediation action 412 may comprise shutting down the workload 112 executing in the trusted execution environment 108, implementing a read-only mode for operations in the workload, restricting access to resources in the workload, executing a fix program to modify parameters in the workload, perform key rotation, disable features, etc.

The control component 110 may call an attestation generator 116 to generate attestation records 500 indicating a result of executing the command 406 in the control element 400; and to generate remediation records 600 having information on a result of executing a remediation action 412 when the command 406 cannot verify compliance of an element of the workload 112 with a condition.

Figure 5:
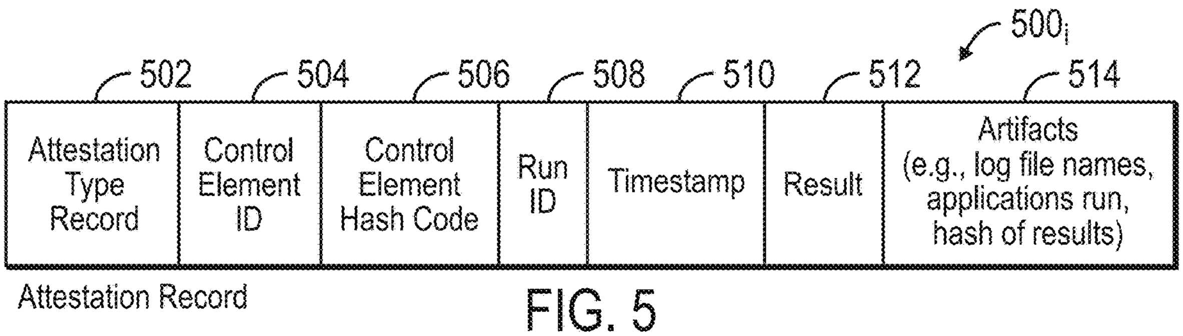
FIG. 5 illustrates an embodiment of an attestation record providing information on execution of a control element to verify compliance of the workload.

An attestation record $\mathbf{500}_i$, as shown in FIG. 5, may indicate an attestation type record 502 indicating the record $\mathbf{500}_i$ is for a control element $\mathbf{400}_i$ result; a control element ID 504 identifying the control element $\mathbf{400}_i$ producing the result or measurement; a control element hash code 506 comprising a hash of the content of the control element $\mathbf{400}_i$ producing the result or measurement; a run ID 508 uniquely identifying the run of the command $\mathbf{406}_i$ a timestamp 510 of when the command 406 ran; a result 512 indicating success or failure of the verification operation; and artifacts 514 of the execution of the command 406, such as log files, applications that run, hash of results, etc.

Figure 6:
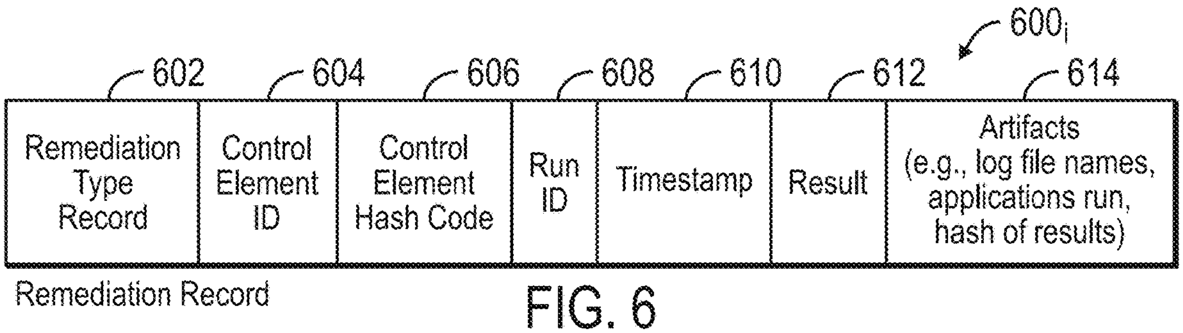
FIG. 6 illustrates an embodiment of a remediation record providing information on result of execution of a remediation action indicated in a control element.

The actor 114 may call the attestation generator 116 to generate a remediation record $\mathbf{600}_i$ for the result of executing a remediation action 412 if compliance was not verified. The remediation record $\mathbf{600}_i$, as shown in FIG. 6, may include a remediation type record 602 indicating the record is for a remediation action 412 result; a control element ID 604 identifying the control element $\mathbf{400}_i$ for which the remediation action 412 was taken; a control element hash code 606 comprising a hash of the content of the control element $\mathbf{400}_i$; a run ID 608 uniquely identifying the run of the remediation action 412; a timestamp 610 of when the remediation action 412 ran; a result 612 indicating success or failure of the remediation action; and artifacts 614 of the remediation action 412, such as log files, applications that run, hash of results, etc.

The control component 110 may further maintain user keys 118 including decryption keys to decrypt control elements $400_i$ provided by the users. In one embodiment, the users keys 118 may include decryption keys supplied by users that provide encrypted control elements $400_i$ to include in the control program 200. In a further embodiment, the trusted execution environment 108 may maintain private/public key pairs for users, distribute the public keys to the users to use to encrypt the control elements $400_i$, and maintain the private keys to use to decrypt the encrypted control elements $400_i$. The control elements $400_i$ may be encrypted in the control program 200. The control component 110 uses the decryption or private keys in the user keys 118 to decrypt control elements $400_i$ in the attestation section 204 to process. Further, the control component 110 or attestation generator 116 may encrypt attestation 500 and remediation 600 records with encryption/private keys specific to a user to receive the records or with one general encryption/private key.

FIG. 1, including components 106, 110, 112, 114, 116, 200, $400_i$ may comprise program code loaded into a memory and executed by one or more processors. Alternatively, some or all of the functions may be implemented as microcode or firmware in hardware devices, such as in Application Specific Integrated Circuits (ASICs).

The arrows shown in FIG. 1 illustrate a flow of information and command execution.

Figure 7A:
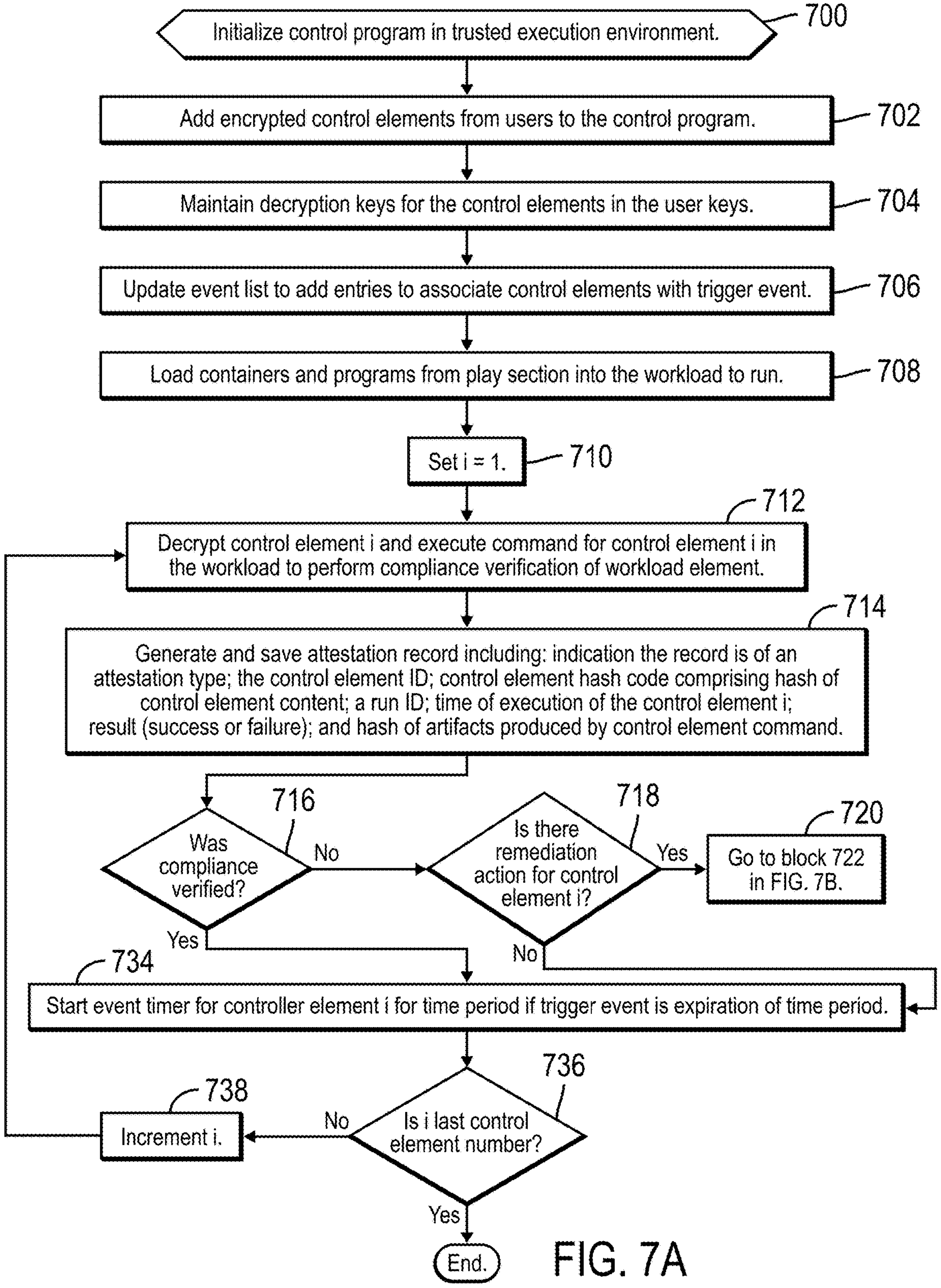
FIGS. 7A and 7B illustrate an embodiment of operations to perform an initial processing of the control elements in the control program.
Figure 7B:
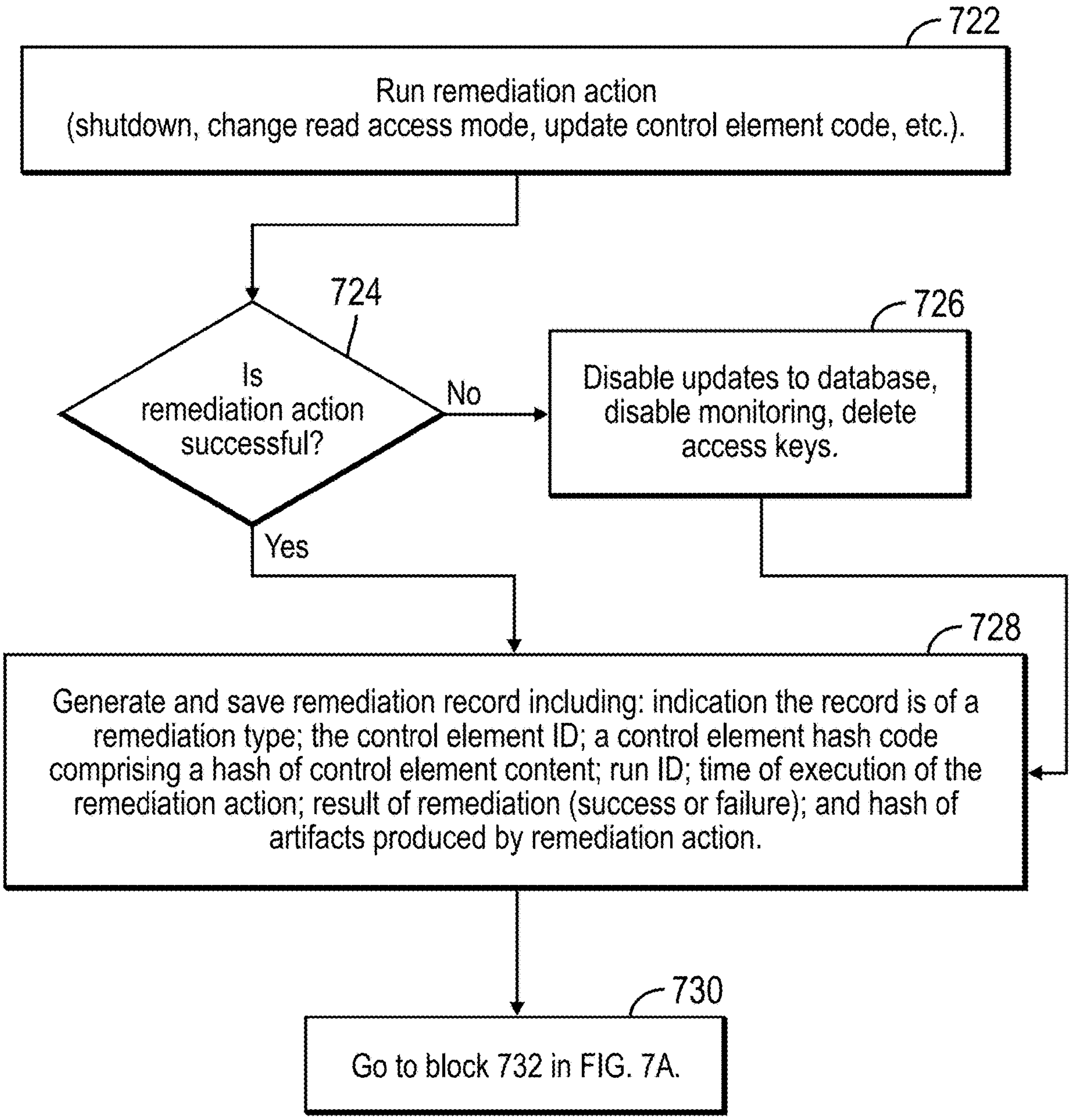

FIGS. 7A and 7B illustrate an embodiment of operations performed by the control component 110, actor 114, and attestation generator 116 to execute control elements $400_i$ in the control program 200 provided by users to perform compliance verification of elements in the workload 112. Upon initializing (at block 700) the control program 200 in the trusted execution environment 108, the control component 110 may add (at block 702) encrypted control elements $400_i$ to the attestation section 204 of the control program 200. The control component 110 may maintain (at block 704) decryption keys for the control elements $400_i$ in the user keys 118 to use to decrypt control elements $400_i$ in the control program 200 to run. The decryption keys may be provided by the users who provide control elements $400_i$ or comprise a private key of a public/private key pair, where the public key is distributed to the user. There may be one private/public key pair for each user, or one public/private key pair for all users. The control component 110 may further update (at block 706) the event list 300 to add entries $300_i$ to associate control elements $400_i$ with trigger events, by indicating control elements $400_i$ in the control elements field 304 in the entry $300_i$ for the trigger event 302 indicated in the control element field 410. The control component 110 may load (at block 708) the containers and programs from the play section 202 to run in the workload 112. The control component 110 may further add control elements $400_i$ from users received after the workload 112 is running (at block 708). A control element $400_i$ added to the control program 200 after the workload 112 is initialized and running may be executed shortly after adding.

To run the control elements $400_i$ in the attestation section 204 after initializing the workload, a variable i may be set (at block 710) to 1. The control component 110 may decrypt (at block 712) the control element $400i$, using the decryption key in the user keys 118 and execute the command 406 for control element $400_i$ in the workload 112 to perform compliance verification of a workload element in the workload 112. The attestation generator 116 may generate and save (at block 714) an attestation record $500_i$ including, but not limited to: indication 502 the record is of an attestation type; the control element ID 402 in field 504; a control element hash code 506 comprising a hash of the control element $400_i$ content in field 506; the run ID 404 in field 508; a time of execution 510 of the command 406; the result 512 (success or failure) of execution of the command 406; and hash of artifacts 514 produced by the command 406. In certain embodiments, the attestation record $500_i$ may be encrypted, such as with an encryption key for the user that provided the control element $400_i$ whose execution resulted in the attestation record $500_i$.

If (at block 716) execution of the command 406 did not verify compliance with conditions of the command 406, then if (at block 718) a remediation action 412 is provided for control element $400_i$, then control proceeds (at block 720) to block 722 in FIG. 7B to call the actor 114 to run the remediation action 412 to perform a remediation operation for the non-compliance of the non-complying workload element, such as a shutdown, change to read access mode, update control element code, etc. If (at block 724) remediation was not successful, then the actor 114 may take action (at block 726) to protect the workload 112, such as disable updates to a database, disable monitoring of the workload 112, delete access keys, etc. If (at block 724) remediation was successful or after performing operations in block 726, the attestation generator 116 may generate and save (at block 728) a remediation record $600_i$ including, but not limited to: indication in field 602 that the record is of a remediation type; the control element ID 402 in field 604; a control element hash code 606 comprising a hash of the control element $400_i$ content; indication in field 608 of the run ID 404 of the remediation action 412; a timestamp 610 of execution of the remediation action 412; a result 612 (success or failure) of execution of the remediation action 412; and a hash of artifacts 614 produced by the remediation action 412. In certain embodiments, the remediation record $600_i$ may be encrypted, such as with an encryption key for the user that provided the control element $400_i$ whose execution resulted in the attestation record $500_i$.

If (at block 716) compliance was verified or if (at block 718) there is no remediation action if compliance is not verified or after generating the remediation record $600_i$ (at block 728), control proceeds to block 734 in FIG. 7A to restart (at block 734) an event trigger timer to trigger a subsequent instance of processing control element $400_i$ after expiration of a next time period, e.g., in minutes, hours, days, etc., if the trigger event 410 for the control element $400_i$ is expiration of a time period. If (at block 736) control element $400_i$ is not the last control element $400_n$, e.g., $i<n$, then i is incremented (at block 738) and control proceeds back to block 712 to process the next control element $400_i$ in the attestation section 204. If (at block 736) the last control element $400_n$ is processed, then control ends.

With the embodiment of FIGS. 7A and 7B, the control component 110 may execute multiple control elements $400_i$ from different users to perform different compliance verifications of elements of the workload 112 and perform remediation actions if elements of the workload 112 that are not verified as complying with compliance requirements. The attestation generator 116 may further generate records $500_i$, $600_i$ on the results of executing the compliance verification and remediation actions, performed if compliance is not verified. In certain embodiments, returned records 500, 600 may not be encrypted. In other embodiments, the records $500_i$, $600_i$ may be encrypted with a key (e.g., encryption key or private key of a private/public key pair) for the user that provided the control element $400_i$ so only the user that provided a control element $400_i$ may access the content of the records $500_i$, $600_i$. In this way, users can only view the records 500, 600 having information on results of the control components $400_i$ they added to the control program 200 and not records produced by control elements $400_i$ from other users.

Figure 8:
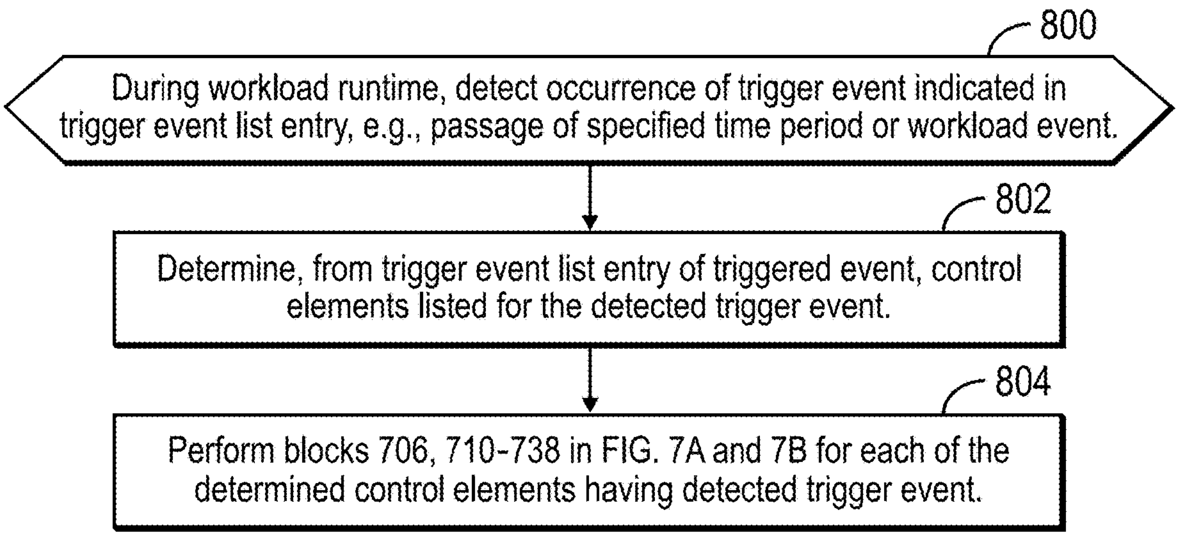
FIG. 8 illustrates an embodiment of operations to process control elements in response to occurrence of trigger events for the control elements during workload runtime in the trusted execution environment.

FIG. 8 illustrates an embodiment of operations performed by the control component 110, actor 114, and attestation generator 116 to execute control elements $400_i$ in the control program 200 provided by users to perform compliance verification of elements in the workload 112 in response to occurrence of trigger events 410 for the control elements $400_1$ while the workload 112 is running. During workload 112 runtime, the control component 110 detects (at block 800) an occurrence of a trigger event 302 indicated in a trigger event list entry $300_i$, e.g., passage of specified time period or workload event. A determination is made (at block 802), from trigger event list entry $300_i$ of triggered event 302, of the control elements 304 listed for the detected trigger event. The operations at blocks 706 and 710-738 in FIGS. 7A and 7B may be performed for the determined one or more control elements 304, i.e., triggered control elements, listed for the detected trigger event 302.

With the embodiment of the operations of FIG. 8, the control elements 400; may be executed multiple times during workload 112 execution when trigger events specified for the control elements are detected. This allows continual verification of compliance of workload 112 elements during workload runtime to ensure that during workload runtime the workload 112 does not fall out of compliance.

Figure 9:
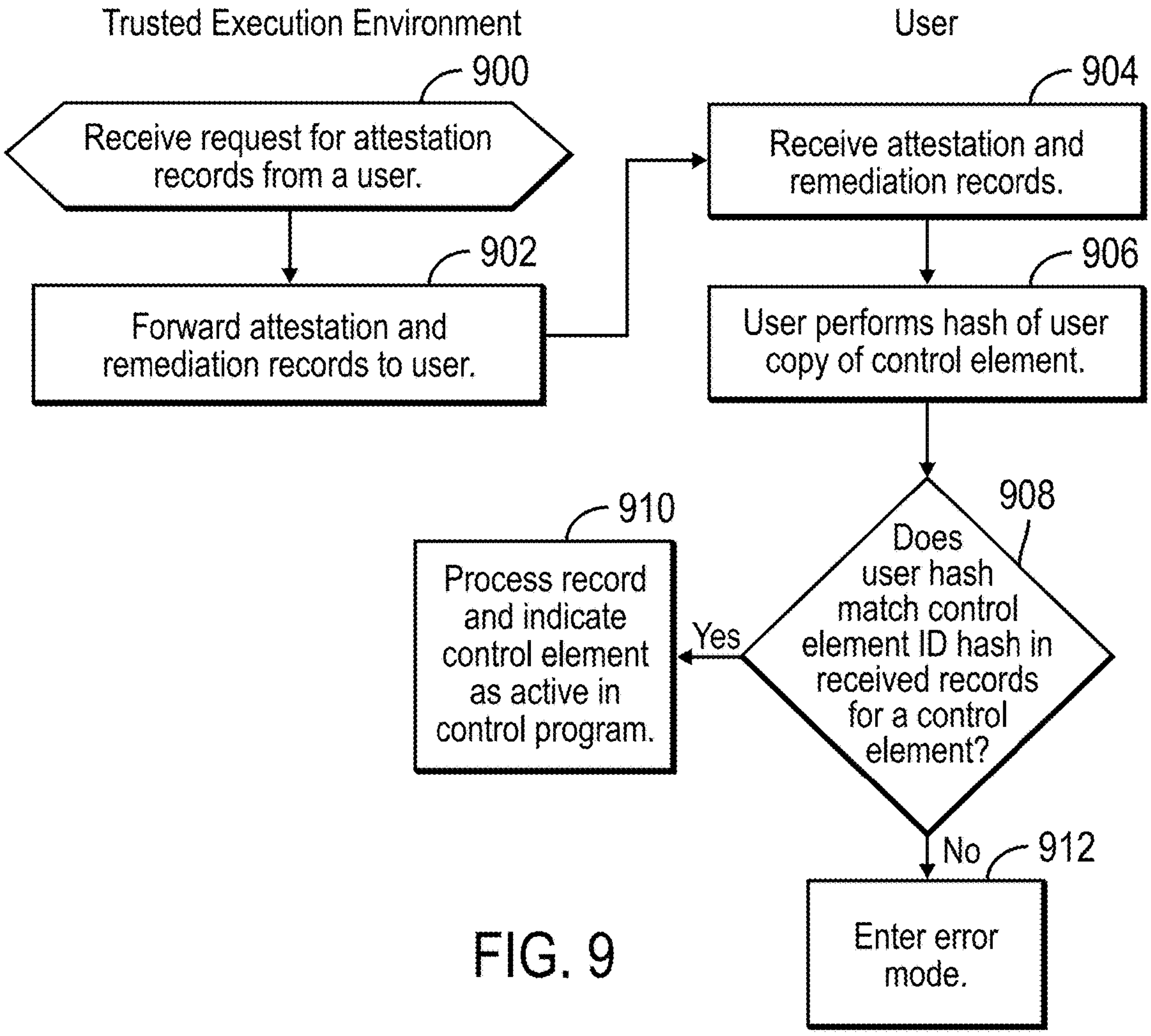
FIG. 9 illustrates an embodiment of operations to provide attestation and remediation records for a control element to a user that provided the control element to the control program.

FIG. 9 illustrates an embodiment of operations performed in the trusted execution environment 108 and at the user system 120. Upon receiving (at block 900) a request for attestation records from a user 120, the control component 110, or other component, may forward (at block 902) the attestation 500 and remediation 600 records to the requesting user 120. Although the requesting user 120 may receive attestation 500 and remediation 600 records from multiple users, because the control element content 506, 606 and artifacts 514, 614 may comprise hashes, the requesting user 120 may only decrypt and access hashed artifacts 514, 614 from control elements 400; provided by that user for which the user encryption and decryption keys are maintained. In further embodiments, certain of the fields of the records 500, 600, such as the results 514, 614, may be encrypted with an encryption key for the user that provided the control element for which the records are generated.

The user 120 receives (at block 904) the attestation 500 and remediation 600. The user may perform (at block 906) a hash function on the user copy of the content for the control element 400; for which the received records 500, 600 were generated. If (at block 908) the user hash matches the control element ID 504, 604, comprising a hash the control component 110 generated from the control element $400_i$ in the received records 500, 600, then the user 120 is assured the user suppled control elements $400_i$ are being processed in the trusted execution environment 108. In such case, the user 120 may indicate the control element $400_i$ identified by the matching control element ID as active in the control program 200. If the hashes match, the user may further process the received records 500, 600 to determine compliance with the user supplied control elements $400_i$ and the results of any remediation if compliance failed. If (at block 908) the user generated hash and the received hash 504, 604 in the received records 500, 600 do not match, then the user 120 may enter an error mode 912 to troubleshoot why the control element hashes do not match, which may indicate the trusted execution environment 108 is experiencing significant errors or its security has been compromised.

The present invention may be a system, a method, and/or a computer program product. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 10:
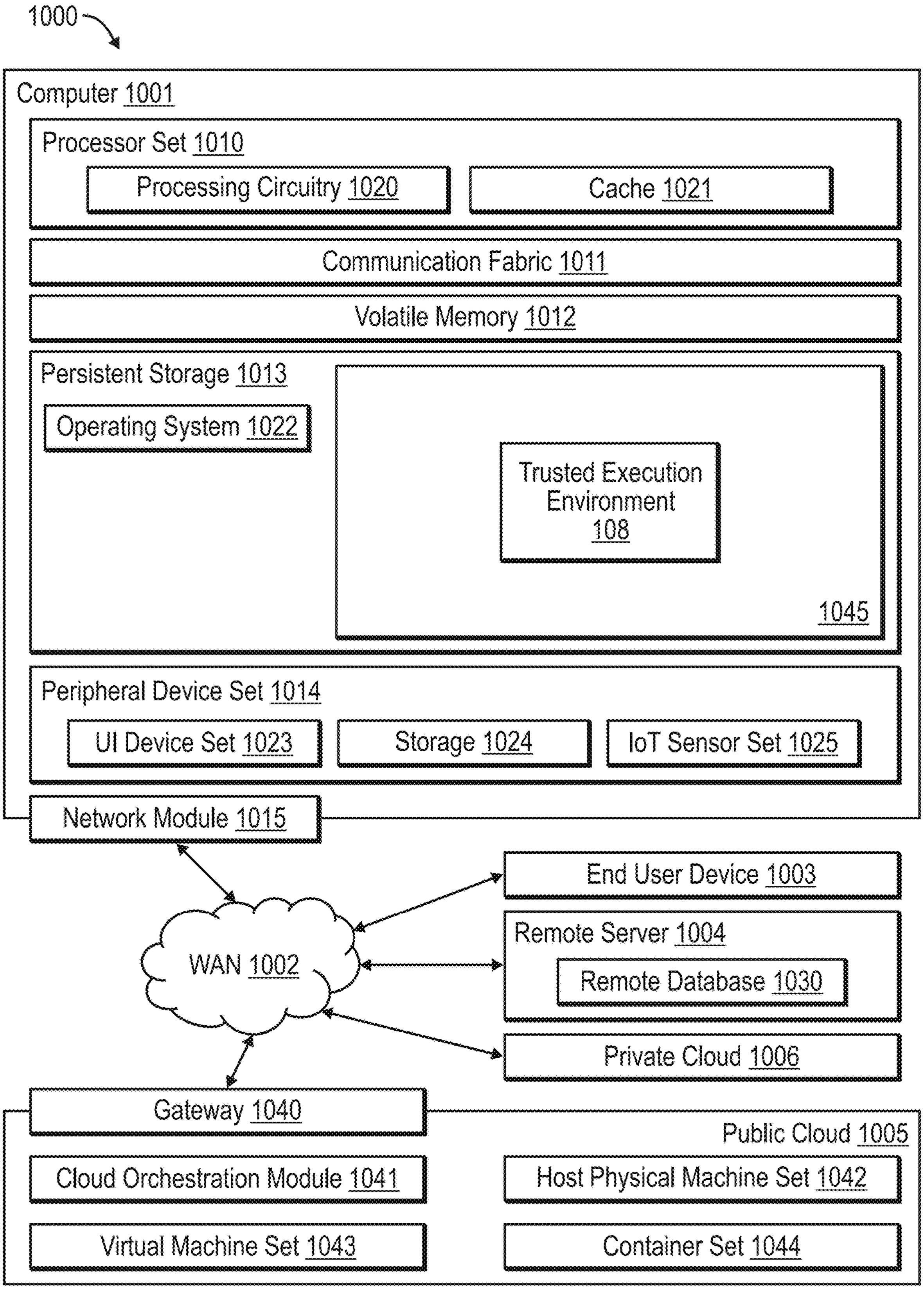
FIG. 10 illustrates a computing environment in which the components of FIG. 1 may be implemented.

With respect to FIG. 10, computing environment 1000 contains an example of an environment for the execution of at least some of the computer code involved in performing the inventive methods, such as the inventive methods of the components 110, 114, and 116 to perform the compliance verification operations in the trusted execution environment 108 implemented in block 1045, as well as part of the processor 1010. In addition to block 1045, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1045, as identified above), peripheral device set 1014 (including user interface (UI) device set 1023, storage 1024, and Internet of Things (IOT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer-readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1045 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, volatile memory 1012 is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read-only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface-type operating systems that employ a kernel. The code included in block 1045 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer-readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN 1002 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on. The EUD 1003 may comprise the user system 120 for multiple users.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

CLOUD COMPUTING SERVICES AND/OR MICROSERVICES (not separately shown in FIG. 10): private and public clouds 1006 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The letter designators, such as i and n, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for performing integrity check of an application in a trusted computing execution environment, the computer program product comprising a computer readable storage medium having computer readable program code embodied therein that when executed performs operations, the operations comprising:

providing a control program for the trusted execution environment having a plurality of control elements provided by users, wherein each of the control elements indicates a trigger event to detect in a workload comprising programs executing in the trusted execution environment, a command to execute to verify compliance of a workload element, produced by the workload, with a requirement, and a remediation action to perform if the command does not verify compliance of the workload element;

detecting a trigger event occurring in the workload associated with a triggered control element of the control elements during execution of the workload in the trusted execution environment; and executing a command indicated by the triggered control element to verify compliance of a specified workload element in the workload, wherein the triggered control element is executed multiple times during execution of the workload to verify compliance of the specified workload element in the workload in response to multiple instances of detecting the indicated trigger event.

2. The computer program product of claim 1, wherein the operations further comprise:

executing a remediation action of the triggered control element in response to the executed command of the triggered control element not verifying compliance of the specified workload element.

3. The computer program product of claim 2, wherein the executed remediation action is a member of a set of remediation actions consisting of shutting down the workload executing in the trusted execution environment, implementing a read-only mode for operations in the workload, restricting access to resources in the workload, executing a fix program to modify parameters in the workload, key rotation, and disable features.

4. The computer program product of claim 2, wherein the operations further comprise:

including a result of the executing the remediation action in a record identifying the triggered control element including the executed command; and returning the record to a user that provided the triggered control element having the executed remediation action.

5. The computer program product of claim 1, wherein the verifying compliance of the specified workload element is a member of a set of compliance verifications consisting of: comparing a software bill of materials of the workload with a list of vulnerabilities; checking vulnerability of databases accessed by the workload; monitoring workload behavior for behavior indicating vulnerabilities; checking for network activity indicating vulnerabilities; and checking on operability of dependent systems.

6. The computer program product of claim 1, wherein the indicated trigger event is a member of a set of trigger events consisting of expiration of a time period, an occurrence of a specified result in the workload, and an unauthorized user attempting to access a resource.

7. The computer program product of claim 1, wherein the operations further comprise:
receiving encrypted control elements from users;
including the encrypted control elements in the control program; and
decrypting a control element in the control program to execute using a decryption key.

8. The computer program product of claim 1, wherein the operations further comprise:
generating an attestation record in response to executing the command indicated by the triggered control element including a result of the verifying compliance of the specified workload element in the workload and an identifier of the triggered control element having the executed command; and
providing the attestation record to a user that provided the triggered control element.

9. The computer program product of claim 1, wherein the operations further comprise:
generating a hash code from content of a control element of the control elements; and
providing the hash code to a user that provided the control element to include in the control program, wherein the user generates a hash code from a user version of the control element to compare with the provided hash code to verify that the control program is executing the control element from the user.

10. A system for performing integrity check of an application in a trusted execution environment, comprising:
a processor; and
a computer readable storage medium having computer readable program code embodied therein that when executed by the processor performs operations, the operations comprising:
providing a control program for the trusted execution environment having a plurality of control elements provided by users, wherein each of the control elements indicates a trigger event to detect in a workload comprising programs executing in the trusted execution environment, a command to execute to verify compliance of a workload element, produced by the workload, with a requirement, and a remediation action to perform if the command does not verify compliance of the workload element;
detecting a trigger event occurring in the workload associated with a triggered control element of the control elements during execution of the workload in the trusted execution environment; and
executing a command indicated by the triggered control element to verify compliance of a specified workload element in the workload, wherein the triggered control element is executed multiple times during execution of the workload to verify compliance of the specified workload element in the workload in response to multiple instances of detecting the indicated trigger event.

11. The system of claim 10, wherein the operations further comprise:
executing a remediation action of the triggered control element in response to the executed command of the triggered control element not verifying compliance of the specified workload element.

12. The system of claim 11, wherein the operations further comprise:
including a result of the executing the remediation action in a record identifying the triggered control element including the executed command; and
returning the record to a user that provided the triggered control element having the executed remediation action.

13. The system of claim 10, wherein the verifying compliance of the specified workload element is a member of a set of compliance verifications consisting of: comparing a software bill of materials of the workload with a list of vulnerabilities; checking vulnerability of databases accessed by the workload; monitoring workload behavior for behavior indicating vulnerabilities; checking for network activity indicating vulnerabilities; and checking on operability of dependent systems.

14. The system of claim 10, wherein the operations further comprise:
receiving encrypted control elements from users;
including the encrypted control elements in the control program; and
decrypting a control element in the control program to execute using a decryption key.

15. The system of claim 10, wherein the operations further comprise: generating an attestation record in response to executing the command indicated by the triggered control element including a result of the verifying compliance of the specified workload element in the workload and an identifier of the triggered control element having the executed command; and providing the attestation record to a user that provided the triggered control element.

16. A method for performing integrity check of an application in a trusted execution environment, comprising:
providing a control program for the trusted execution environment having a plurality of control elements provided by users, wherein each of the control elements indicates a trigger event to detect in a workload comprising programs executing in the trusted execution environment, a command to execute to verify compliance of a workload element, produced by the workload, with a requirement, and a remediation action to perform if the command does not verify compliance of the workload element;
detecting a trigger event occurring in the workload associated with a triggered control element of the control elements during execution of the workload in the trusted execution environment; and
executing a command indicated by the triggered control element to verify compliance of a specified workload element in the workload, wherein the triggered control element is executed multiple times during execution of the workload to verify compliance of the specified workload element in the workload in response to multiple instances of detecting the indicated trigger event.

17. The method of claim 16, further comprising:
executing a remediation action of the triggered control element in response to the executed command of the triggered control element not verifying compliance of the specified workload element in the workload.

18. The method of claim 17, further comprising:
including a result of the executing the remediation action in a record identifying the triggered control element including the executed command; and
returning the record to a user that provided the triggered control element having the executed remediation action.

19. The method of claim 16, further comprising:
receiving encrypted control elements from users;
including the encrypted control elements in the control program; and decrypting a control element in the control program to execute using a decryption key.

20. The method of claim 16, further comprising:

generating an attestation record in response to executing the command indicated by the triggered control element including a result of the verifying compliance of the specified workload element in the workload and an identifier of the triggered control element having the executed command; and providing the attestation record to a user that provided the triggered control element.

* * * * *